Patented Mar. 31, 1925.

1,532,005

UNITED STATES PATENT OFFICE.

HERMANUS VAN HASELEN, OF ROTTERDAM, NETHERLANDS, ASSIGNOR, BY MESNE ASSIGNMENTS, TO N. V. VAN DEN BERGH'S FABRIEKEN, OF ROTTERDAM, NETHERLANDS.

PROCESS OF PREPARING A FOOD.

No Drawing. Application filed August 28, 1923. Serial No. 659,830.

*To all whom it may concern:*

Be it known that I, HERMANUS VAN HASELEN, residing at Rotterdam, the Netherlands, have invented certain new and useful Improvements in Processes of Preparing a Food, of which the following is a specification.

The invention relates to a process of preparing a food designed particularly as a substitute for the natural food of infants.

According to the invention the new food is prepared by a process characterized in that milk, preferably full milk, is mixed with sugar, flour and lactate of lime while before, during or after the mixing a drying action is had.

According to the invention the milk is preferably sprayed or atomized through use of a warm or not warm and preferably indifferent stream of gas.

The addition of flour, sugar and lactate of lime may also take place before, during, or after the drying, spraying, or atomizing. It is of great advantage to have the flour a little dextrinized at about 60° C. so that this material becomes more digestible. The dextrinizing may take place before, during, or after mixing.

The best results are obtained in atomizing the liquid or the liquid with the additions in all directions nearly horizontally as a haze and in conducting the dry medium through the more or less disc-like veil. The product to be atomized is in that case but little effected by the applied temperatures. It is clear that in connection with the proteins and vitamines this is of very great importance.

According to the invention the best results are obtained in mixing 1110 litres of full milk of a percentage of fats of about 3–4% before, during, or after drying, atomizing, or spraying with 47,5 kg of sugar and 12,5 kg of flour. The latter material is somewhat dextrinized before, during, or after drying, atomizing or spraying. Moreover, at some moment of the process ½% lactate of lime is added calculated in accordance with the total quantity of weight of sugar plus flour, that is about 0.3 kg. A white floury product with a creamy tint which is prepared with water is obtained. By adding a desired quantity of boiling water during continued stirring, any requisite proportional mixture of the final product may be obtained.

Also for older weak children and subnourished persons the new food may be applied with success.

In accordance with the purpose it will be possible to add other materials to the milk or to the dried, atomized, or sprayed product and also to start from butter-milk or suchlike liquids.

A strong food for weak, subnourished children is prepared in dissolving nearly 45 g. of the above obtained powder in 250 g. of water.

I claim:

1. A process for preparing a food product, consisting in mixing whole milk, sugar, flour and calcium lactate, and submitting the mixture to a drying action.

2. A method of preparing a food product, consisting in mixing whole milk, sugar, flour, and calcium lactate, and spraying the mixture in all directions in a substantially horizontal plane under pressure.

3. A method of preparing a food product, consisting in mixing whole milk, sugar, flour, and calcium lactate, and spraying the mixture in all directions in a substantially horizontal plane under pressure, and passing a drying medium through the horizontal spray resulting from the use of the gas.

In testimony whereof I affix my signature.

HERMANUS VAN HASELEN.